United States Patent [19]
Waido

[11] Patent Number: 5,285,222
[45] Date of Patent: Feb. 8, 1994

[54] PROGRESSIVE LENS SERIES
[75] Inventor: Richard P. Waido, West Hartford, Conn.
[73] Assignee: Gentex Optics, Inc., Carbondale, Pa.
[21] Appl. No.: 979,628
[22] Filed: Nov. 20, 1992
[51] Int. Cl.⁵ ................................................ G02C 7/06
[52] U.S. Cl. .................................................... 351/169
[58] Field of Search ................................. 351/168–172
[56] References Cited
U.S. PATENT DOCUMENTS
5,123,725  6/1992  Winthrop ............................ 351/169

Primary Examiner—Scott J. Sugarman
Attorney, Agent, or Firm—Shenier & O'Connor

[57] ABSTRACT

A progressive power lens series in which the surface of each lens body has first and second vision portions which differ in power in accordance with a power curve which lies entirely in the y-z plane of a Cartesian coordinate system and which is the umbilical portion of the principal meridian of the progressive surface with the curvature of the surface in at least one of said vision portions spreading away from the power curve in accordance with a spreading function defined by the intersection of nested non-bipolar conic sections or nested hyperbolic cosines with the x-y plane of the coordinate system.

24 Claims, 13 Drawing Sheets

PROGRESSIVE LENS SERIES

FIELD OF THE INVENTION

The invention is in the field of ophthalmic lenses and more particularly it relates to new series of progressive lenses.

BACKGROUND OF THE INVENTION

Presbyopia is a condition of the human eye which increases with age and which requires correction for near distance vision. An individual suffering from this condition may also require correction for far distance vision. In efforts to provide a single lens incorporating corrections for both near and far distance, there have been developed progressive lenses.

Winthrop U.S. Pat. No. 4,861,153 issued Aug. 29, 1989, discusses various progressive lens designs of the prior art. This patentee describes the defect of many such lenses as failing to provide visual continuity being, in effect, similar to trifocal lenses. Other efforts of the prior art to produce progressive lenses are said to produce results in which the aberration level is substantial or which are objectionably astigmatic.

With the foregoing in mind, Winthrop sets out to develop a progressive addition spectacle lens with the smoothest possible distribution of dioptric power and the lowest possible level of unwanted astigmatism. In so doing, Winthrop provides a family or series of lenses in which the entire progressive surface can be considered to be generated by the curve of intersection formed between a sphere of variable radius and a corresponding cylinder of variable diameter. In the resultant lens, the distance and near vision "areas" are mathematical points so that the astigmatism is distributed over the entire area of the lens and thus is minimized. These distance and near power points are connected by an umbilic line of progressive dioptric power. These points, moreover, comprise the poles of a bipolar system of surface power contours.

While Winthrop provides a progressive lens having visual continuity and a low level of unwanted astigmatism, his teaching is limited to a single family or series of progressive lenses having the characteristics discussed hereinabove.

SUMMARY OF THE INVENTION

One object of my invention is to provide novel series of progressive lenses which overcome the defects of progressive lenses of the prior art.

Another object of my invention is to provide novel series of progressive lenses having low minimum values of surface astigmatism.

A further object of my invention is to provide novel series of progressive lenses having low average astigmatism.

Still another object of my invention is to provide progressive lens series, the spreading functions of which are defined by nested non-bipolar conic sections.

Still another object of my invention is to provide progressive lens series, the spreading functions of which are determined by families of nested hyperbolas.

A still further object of my invention is to provide progressive lens series, the spreading functions of which are determined by families of nested parabolas.

A still further object of my invention is to provide progressive lens series, the spreading functions of which are determined by the families of nested non-bipolar and non-harmonic circles.

Yet another object of my invention is to provide progressive lens series, the spreading functions of which are determined by families of nested ellipses.

A still further object of my invention is to provide progressive lens series, the spreading functions of which are defined by families of nested hyperbolic cosines.

BRIEF DESCRIPTION OF THE DRAWINGS

In the accompanying drawings to which reference is made in the instant specification and in which like reference characters are used to indicate like parts in the various views.

DESCRIPTION OF THE PREFERRED EMBODIMENT

As is known in the art, a new surface of progressive optical power incorporated in a progressive addition lens may be generated by the technique of mathematically extracting slices from a multiplicity of surfaces, commonly spheres, and assembling the slices to form the surface. The multiplicity of surfaces is established by a "power curve" which is a plane curve of varying curvature lying wholly in the Y, Z plane. The slicing and assembling are governed by families of mathematical functions called "spreading functions".

Figure 1:
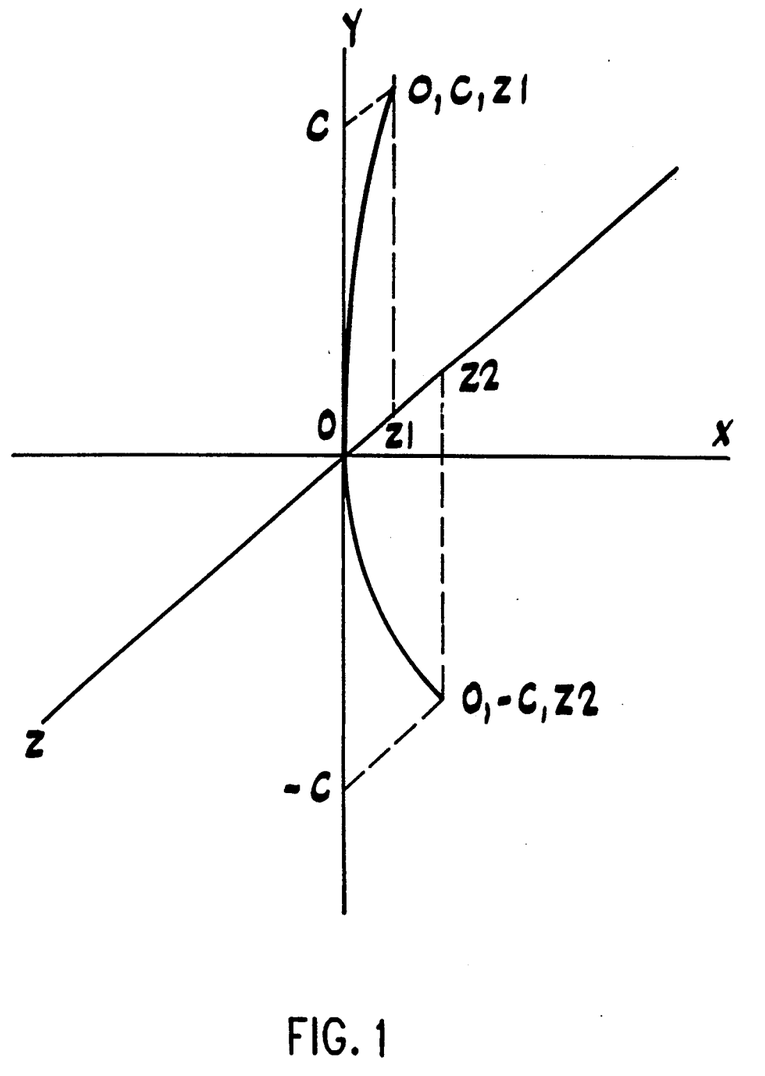
FIG. 1 is a plot showing one example of a power curve for a progressive lens.

Referring now to FIG. 1, I have shown one example of a power curve between the points $(0, C, Z1)$ and $(0, -C, Z2)$ in a Cartesian coordinate system. As will readily be apparent from the plot of FIG. 1, the power curve lies entirely in the Y-Z plane.

After the power curve has been determined, the spreading functions are used to spread the curvature of the power curve away from the power curve, thus to generate the surface of progressive optical power. This is done by associating with each pair of coordinates X, Y of the spreading functions one and only one point on the power curve and linking X and Y up with a coordinate Z coming from one hemisphere of the sphere, a great circle of which is the osculating circle of the power curve at that unique point. The resultant point (X, Y, Z), so determined, lies on the surface of progressive optical power and the multiplicity of such points define the surface.

As is well known, a conic section in the X-Y plane whose vertex is at the origin and whose vertex radius of curvature is the constant r is defined by the equation:

$$x^2+(1+k)y^2-2ry=0 \qquad (1)$$

where k is the conic constant which determines the type of conic. For $k>0$, the conic is an ellipse; for $k=0$ it is a circle; for $-1<k<0$ it is an ellipse; for $k=-1$ it is a parabola; and for $k<-1$ it is a hyperbola.

I have discovered that a generalized form of equation (1) can be used to define the spreading functions for generating a surface of progressive optical power to produce a progressive lens having visual continuity as well as a low minimum value of surface astigmatism and a low average astigmatism.

The generalized form of equation (1) is:

$$x^2+(1+k)(|y|-b)^2-2r(|y|-b)=0 \qquad (2)$$

where $k=k(a,c)$ is a variable conic constant, $b=b(a,c)$ is a variable y-intercept, $r=r(a,c)$ is a variable radius, "a" is a running parameter and c is a number which fixes the end points of the power curve.

For a given choice of the functions $k(a,c)$, $b(a,c)$ and $r(a,c)$, as the parameter "a" runs through the range of values proper to the choice, equation (2) completely fills space with nested sheet-like surfaces, each of which intersects the x-y plane in one or another conic section to define spreading functions which can be used to generate surfaces of progressive optical power.

It will be appreciated that the variable radius of curvature function $r(a,c)$ can be constructed in various ways. However, r must be infinite when the y-intercept of the spreading function is zero and must approach zero as the y-intercept of the spreading function approaches the end points c,-c of the power curve.

There are given below a number of numerical examples for producing various progressive lens surfaces. Each of the examples is for an 80 mm diameter lens blank made from a material having a refractive index of 1.498. The distance optical power is +6.00 diopters and the near optical power is 8.00 diopters. Thus, the power add is 2.00 diopters. It will readily be appreciated that the examples given below are illustrative only and that my invention contemplates other diameters, materials, refractive indices, powers and adds.

Associated with each of the numerical examples defined hereinbelow are figures in three parts A, B, and C. Part A which is an x-y plot in millimeters over the extent of the lens surface shows the appearance of the spreading function. That is to say, it correlates any x,y point on the surface of the lens with a certain y axis intercept corresponding to a point on the power curve. It thus determines the sagitta value z at the particular x,y coordinate in question.

Part B shows the "mean add" which is defined as the amount in diopters by which the spherical-equivalent optical power exceeds the distance optical power. Again, the plot is in the x,y plane over the extent of the lens and the "mean add" is indicated in 0.25 diopter steps.

Part C, which again is a plot in the x,y plane over the extent of the lens with the x and y dimensions in millimeters, shows the surface astigmatism with the contours being drawn at 0.50 diopter intervals.

EXAMPLE I

Figure 2A:
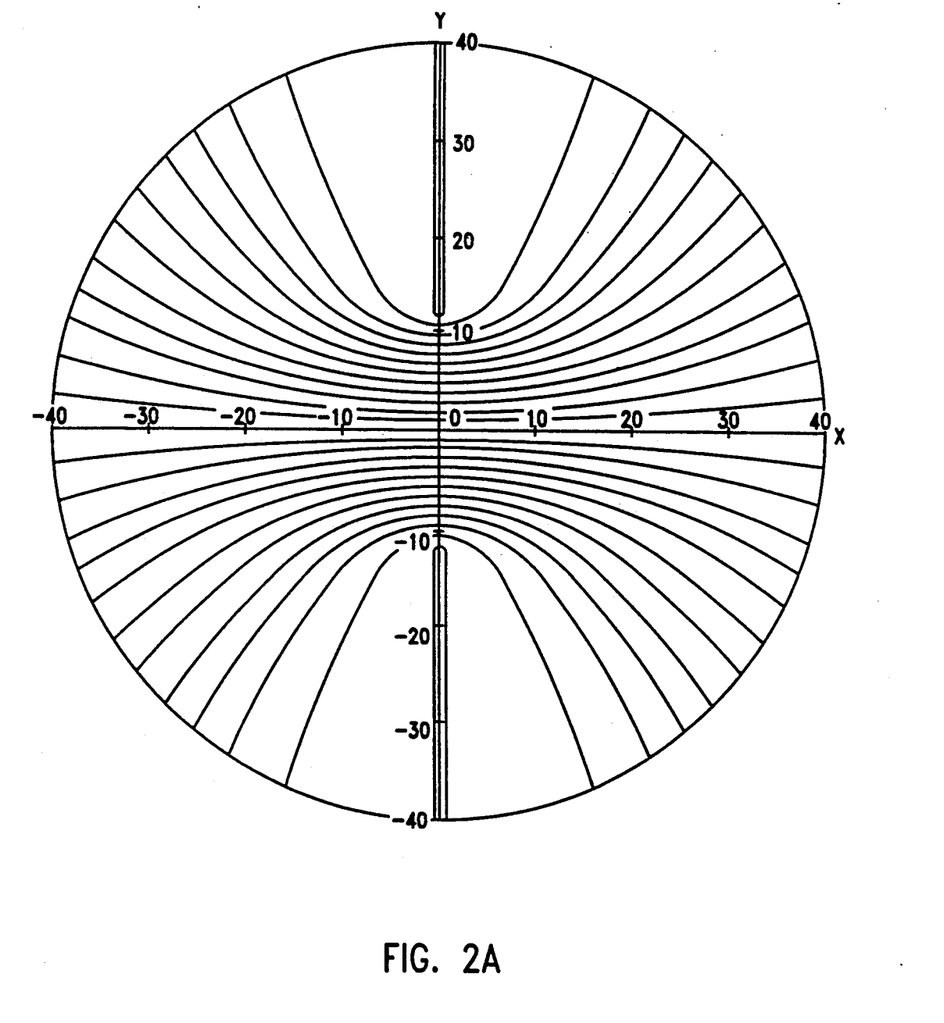
FIG. 2A is a plot of hyperbolic spreading functions for a given set of parameters of a progressive lens in accordance with my invention.

FIG. 2A shows the hyperbolic spreading functions defined by:

$$0 \leq a \leq 1$$

$$c = 12 \text{ mm}$$

$$k = \frac{1 - .7255 - 1/a^2}{.7225}$$

$$b = ac$$

$$r = \frac{(c/.7225)(1 - a^2)}{a}$$

It will readily be appreciated that a particular curve of FIG. 2A is arrived at by first selecting a value of "a" between zero and 1 and arriving at numerical values for k, b and r. These values are then substituted in equation (2) and the plot of the curve is obtained by, for example, solving the equation for values of x corresponding to various values of the magnitude of y. The other curves of FIG. 1A are similarly arrived at for other values of "a".

Figure 2B:
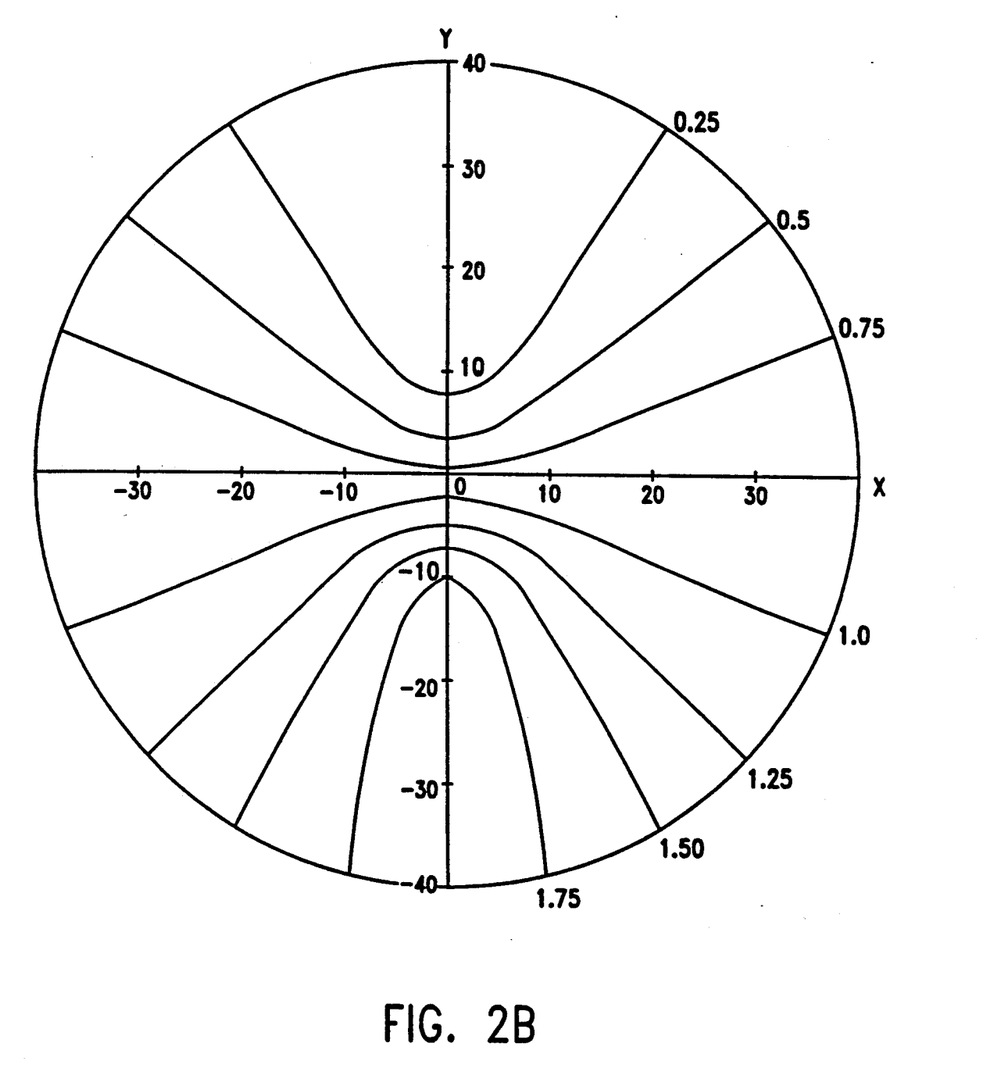
FIG. 2B is a plot of the "mean add" or amount by which the spherical-equivalent optical power exceeds the distance optical power for a lens having the spreading functions of FIG. 2A.
Figure 2C:
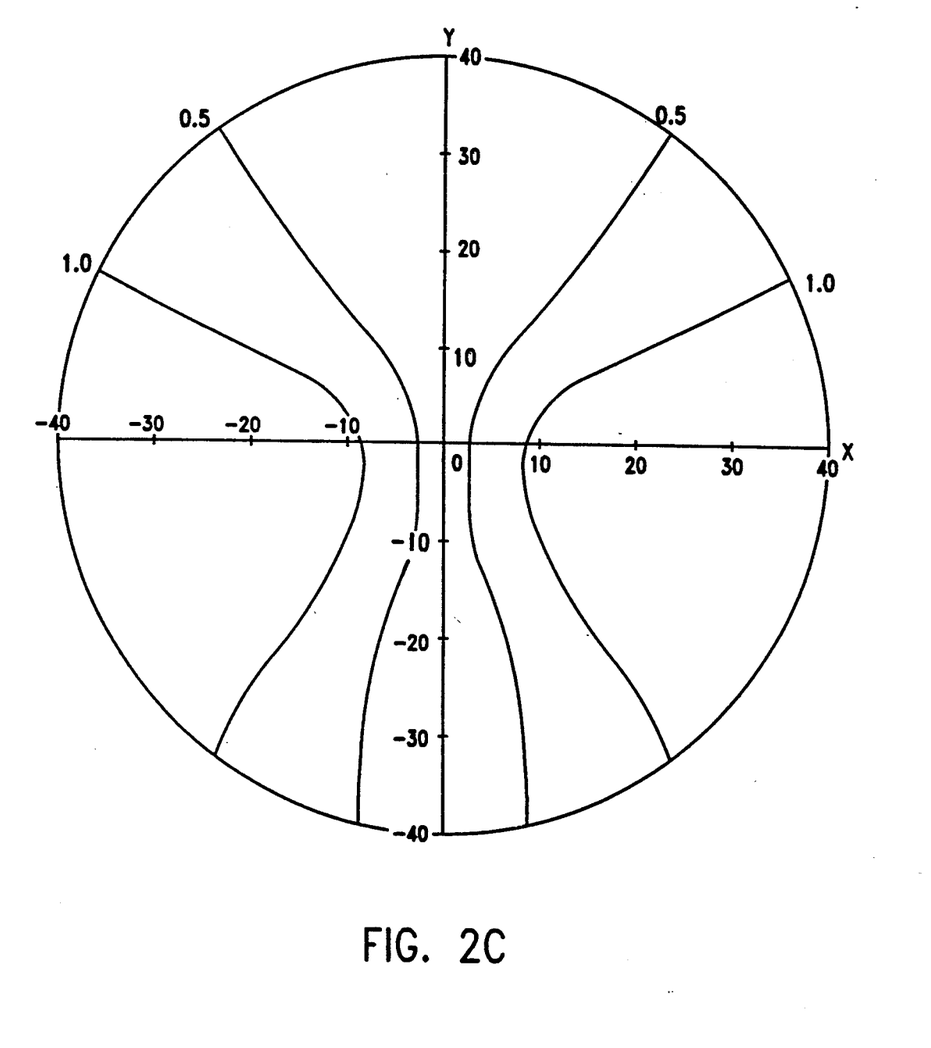
FIG. 2C is a plot of the surface astigmatism of a lens having the spreading functions of FIG. 2A.

FIG. 2B shows the mean add of the resulting surface when the power curve is selected as the involute of a circle. It will thus be seen that the power law combined with the spreading functions of FIG. 2A completely define the surface of the progressive lens. FIG. 2C shows the surface astigmatism of a lens surface produced in accordance with FIGS. 2A and 2B. It is to be noted that the maximum astigmatism in FIG. 2C is 1.34 D, the two points of such maximum astigmatism being at $x=+/-37$ mm and $y=-16$ mm. The average astigmatism represented by the plot of FIG. 2C is 0.79 D.

EXAMPLE II

Figure 3A:
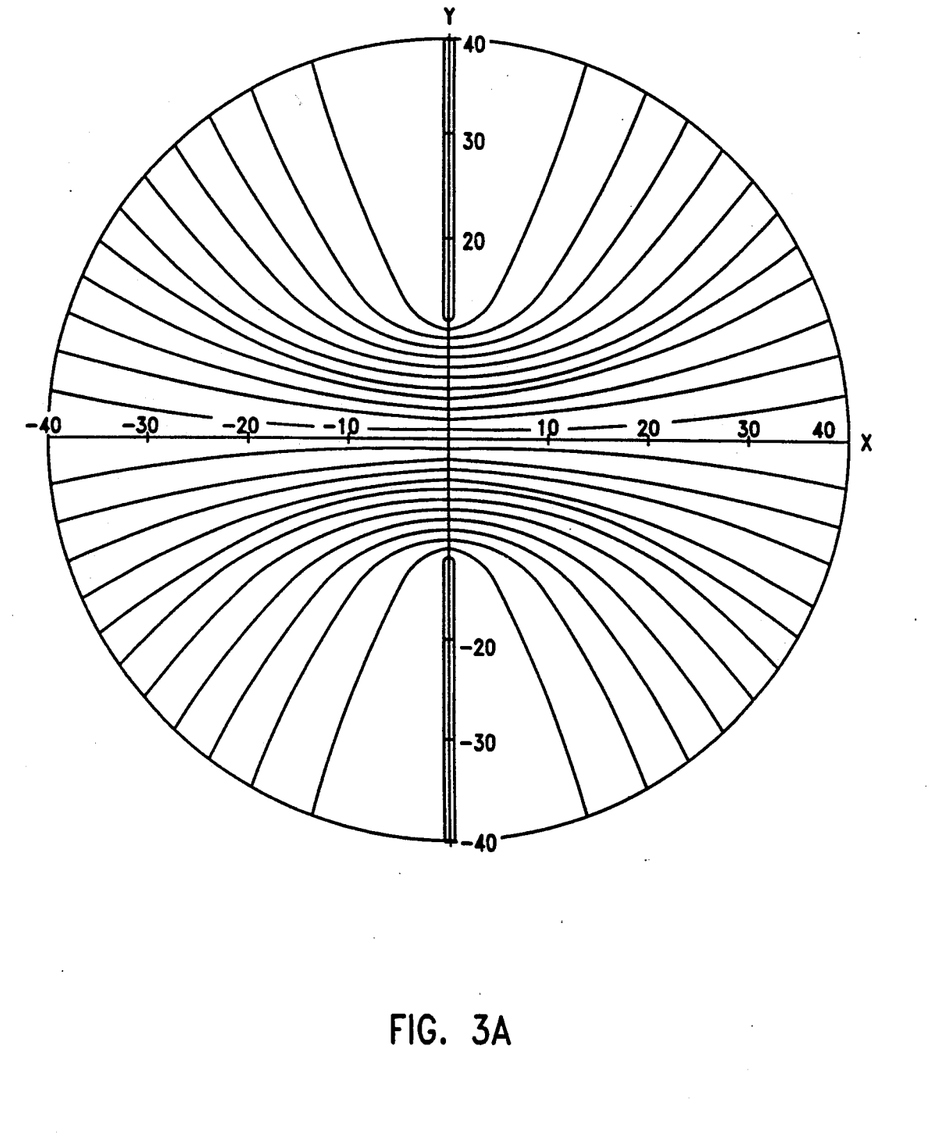
FIG. 3A is a plot of parabolic spreading functions for a given set of parameters of a progressive lens in accordance with my invention.

Referring now to FIG. 3A, I have shown the parabolic spreading functions defined by:

$0 \leq a \leq 1$
$c = 12$ mm
$k = -1$
$b = ac$
$r = 2c(1-a^2)/a$

Figure 3B:
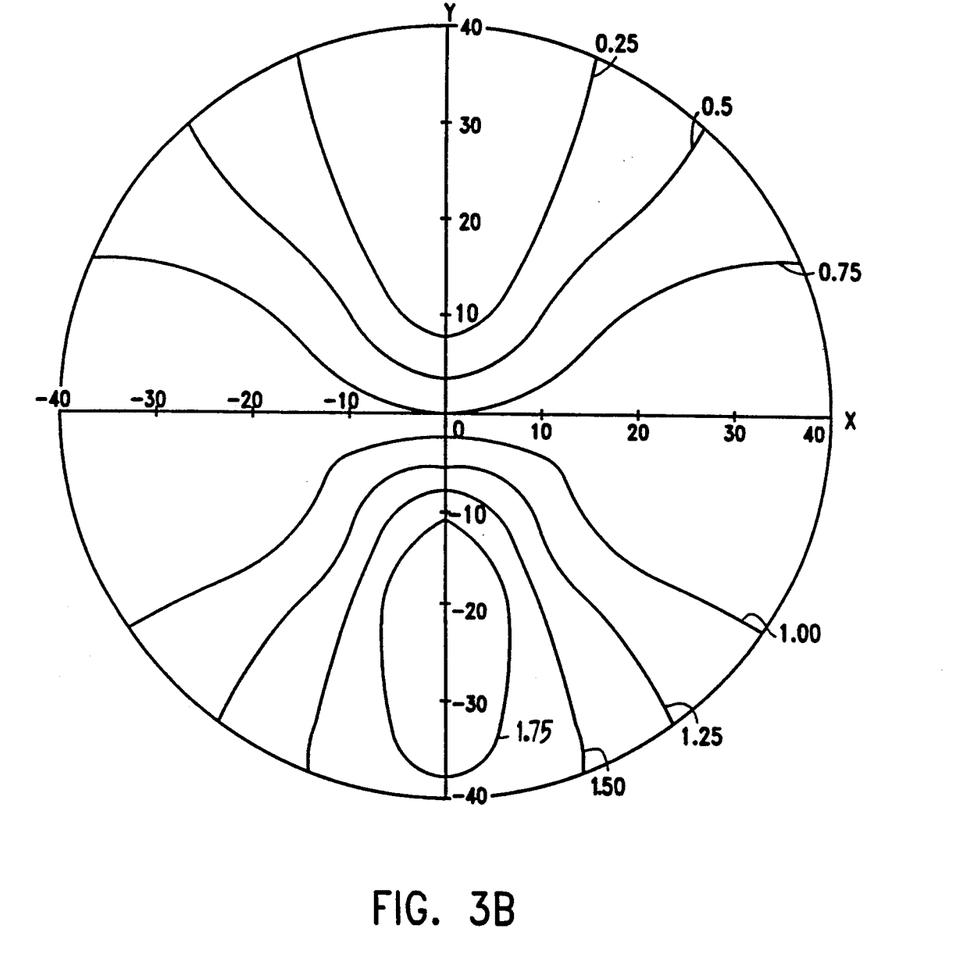
FIG. 3B is a plot of the "mean add" or amount by which the spherical-equivalent optical power exceeds the distance optical power for a lens having the spreading functions of FIG. 3A.
Figure 3C:
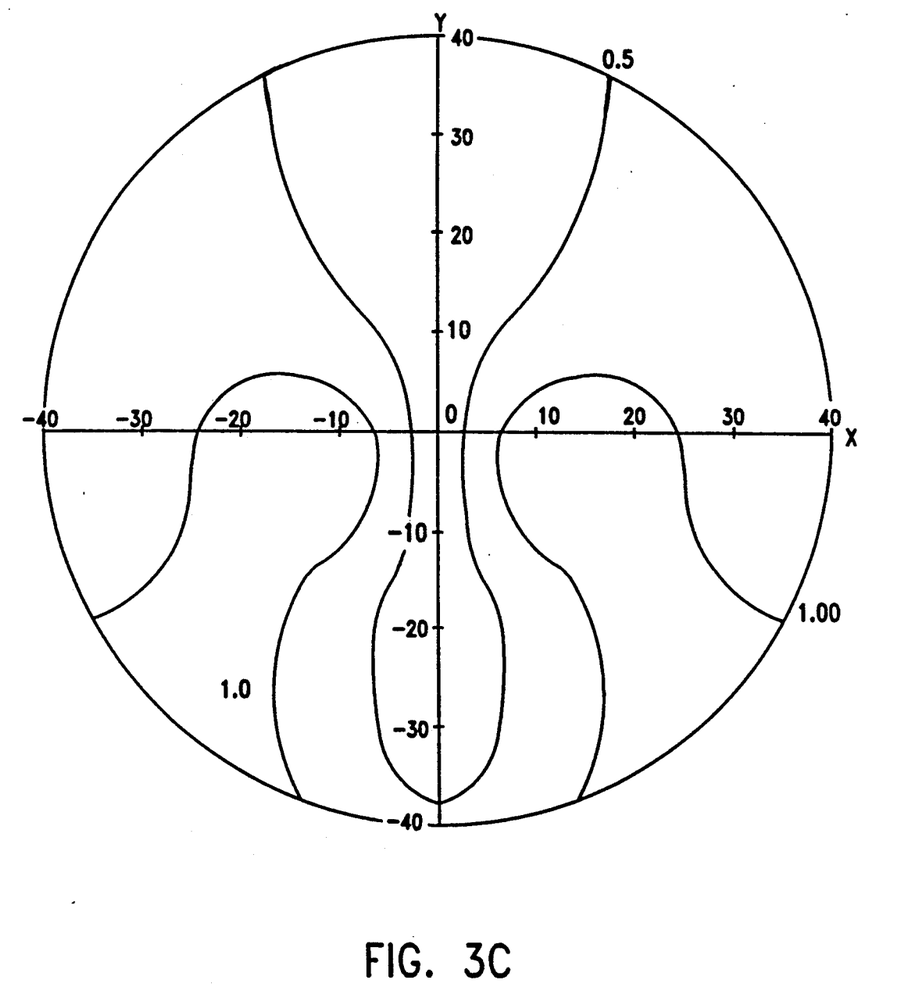
FIG. 3C is a plot of the surface astigmatism of a lens having the spreading functions of FIG. 3A.

The curves of FIG. 3A are arrived at in the manner described hereinabove in connection with FIG. 2A. Again, FIG. 3B shows the mean add of the resulting surface when the power curve is the involute of a circle. FIG. 3C shows the surface astigmatism of a surface formed in accordance with FIGS. 3A and 3B. In connection with FIG. 3C it will be noted that maximum astigmatism is 1.30 D occurring at two points of x of $+/-26$ millimeters and y $-31$ millimeters. The average astigmatism is 0.73 D.

EXAMPLE III

Figure 4A:
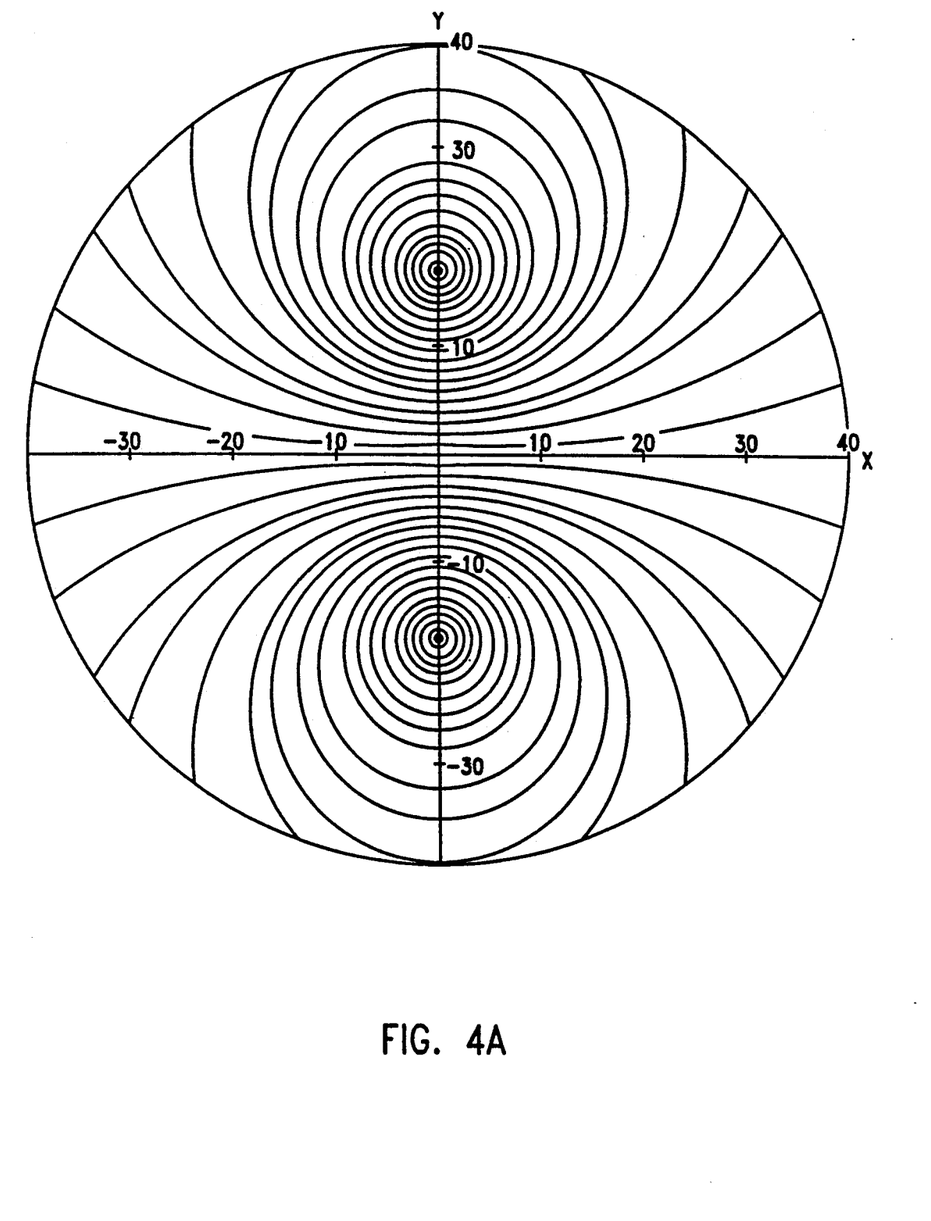
FIG. 4A is a plot of non-bipolar circular spreading functions for a given set of parameters of a progressive lens in accordance with my invention.

Referring now to FIG. 4A, I have shown non-bipolar circular spreading functions defined by:

$0 \leq a \leq 1$
$c = 19$ mm
$k = 0$
$b = ac$
$r = 0.373c(1-a^2)/a$

Again, a particular curve of FIG. 4A is defined by equation (2) with the values of c, a, b and r corresponding to a particular value of "a" substituted therein.

Figure 4B:
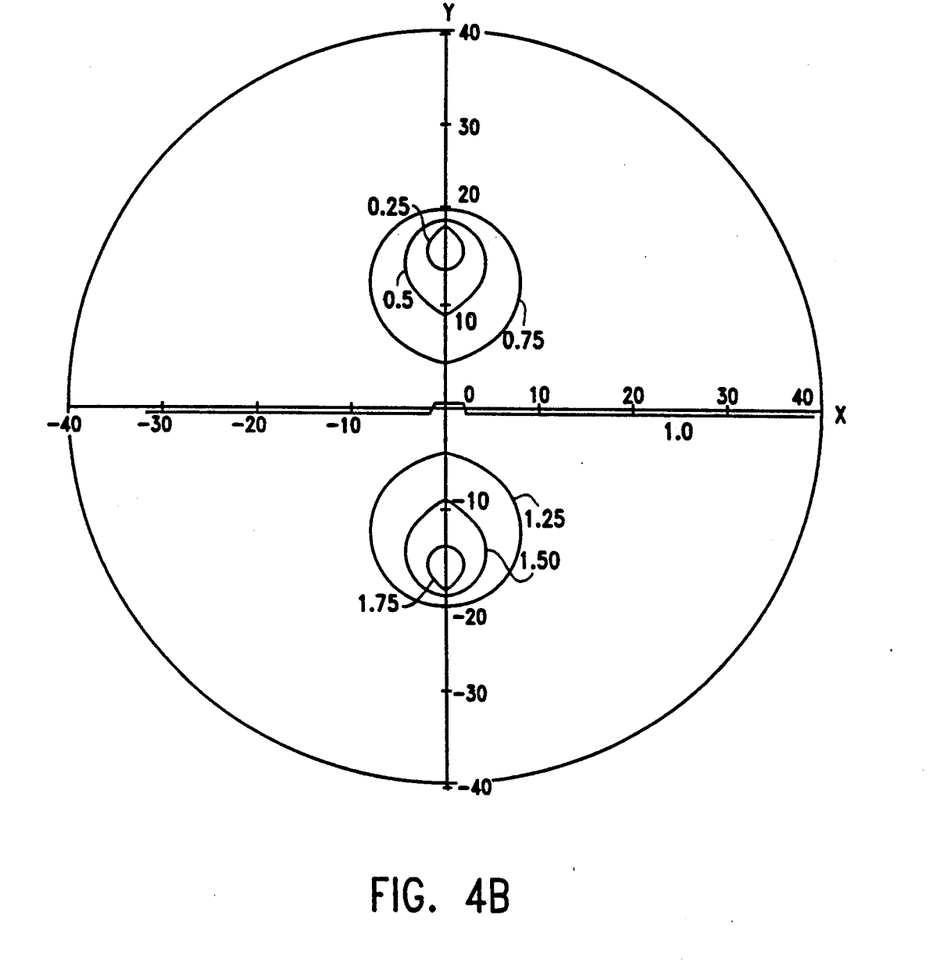
FIG. 4B is a plot of the "mean add" or amount by which the spherical-equivalent optical power exceeds the distance optical power for a lens having the spreading functions of FIG. 4A.

FIG. 4B shows the mean add of the resulting surface when the power curve is such as to cause the curvature and hence the optical power to be linear in the y coordinate.

Figure 4C:
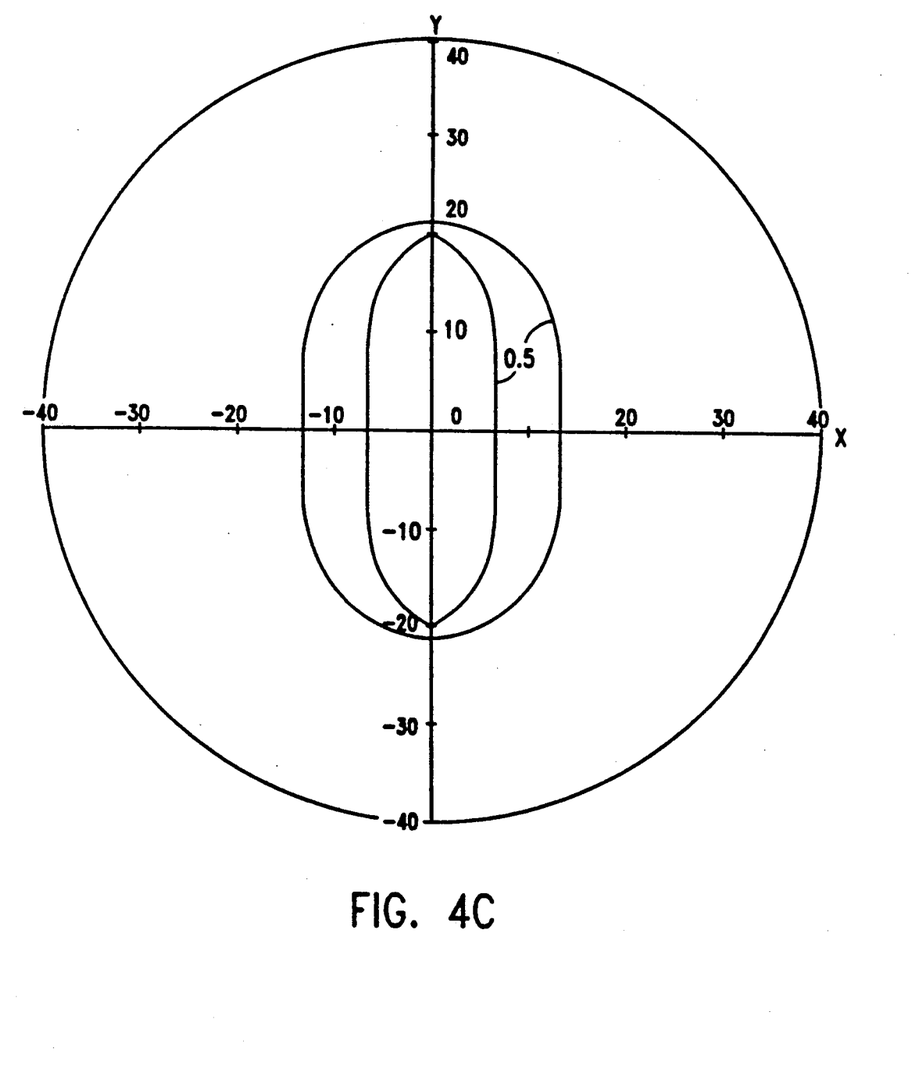
FIG. 4C is a plot of the surface astigmatism of a lens having the spreading functions of FIG. 4A

FIG. 4C shows the surface astigmatism for a surface generated in accordance with FIGS. 4A and 4B. As shown by FIG. 4C, in this configuration the maximum value of the surface astigmatism is most remarkable, being 0.56 D occurring at x=10 millimeter and y=zero. It is noted that this maximum value of 0.56 D is a mere 28% of the add power of 2 D. Also remarkable in this embodiment is the low average astigmatism of 0.25 D.

I have discovered that one particular embodiment of my invention has the property of satisfying Laplace's equation and thereby being harmonic. This is the set of confocal hyperbolas found for example in elliptic coordinates. They correspond to e=1 in Example I or in the instance in which:

c = arbitrary
$k = -1/a^2$
$b = ac$
$r = c(1-a^2)/a$

It is to be noted that while none of the above examples uses a conic constant which gives rise to ellipses or which varies enough to mix two or more types of conic sections in one surface, such is contemplated in accordance with my invention.

Another embodiment of my invention utilizes the hyperbolic cosign to define the spreading functions. In this case, the general equation is:

$$|y| = b \cosh(x/\sqrt{br}) \quad (3)$$

where $\cosh(u) = (e^u + e^{-u})/2$ so that (3) becomes $$|y| = \frac{b[e^{(x/\sqrt{br})} + e^{-(x/\sqrt{br})}]}{2} \quad (4)$$

where
b = b(a,c) is a variable y-intercept
r = r(a,c) is a variable radius of curvature
a is a running parameter
c is a number which fixes the end points of the power curve As the parameter "a" runs through the range of values appropriate to a given choice of the functions b and r, equation (4) completely fills space with nested sheet-like surfaces which intersect the x-y plane in a variety of hyperbolic cosigns. These surfaces can then be used as spreading functions to generate surfaces of progressive optical power.

EXAMPLE IV

Figure 5A:
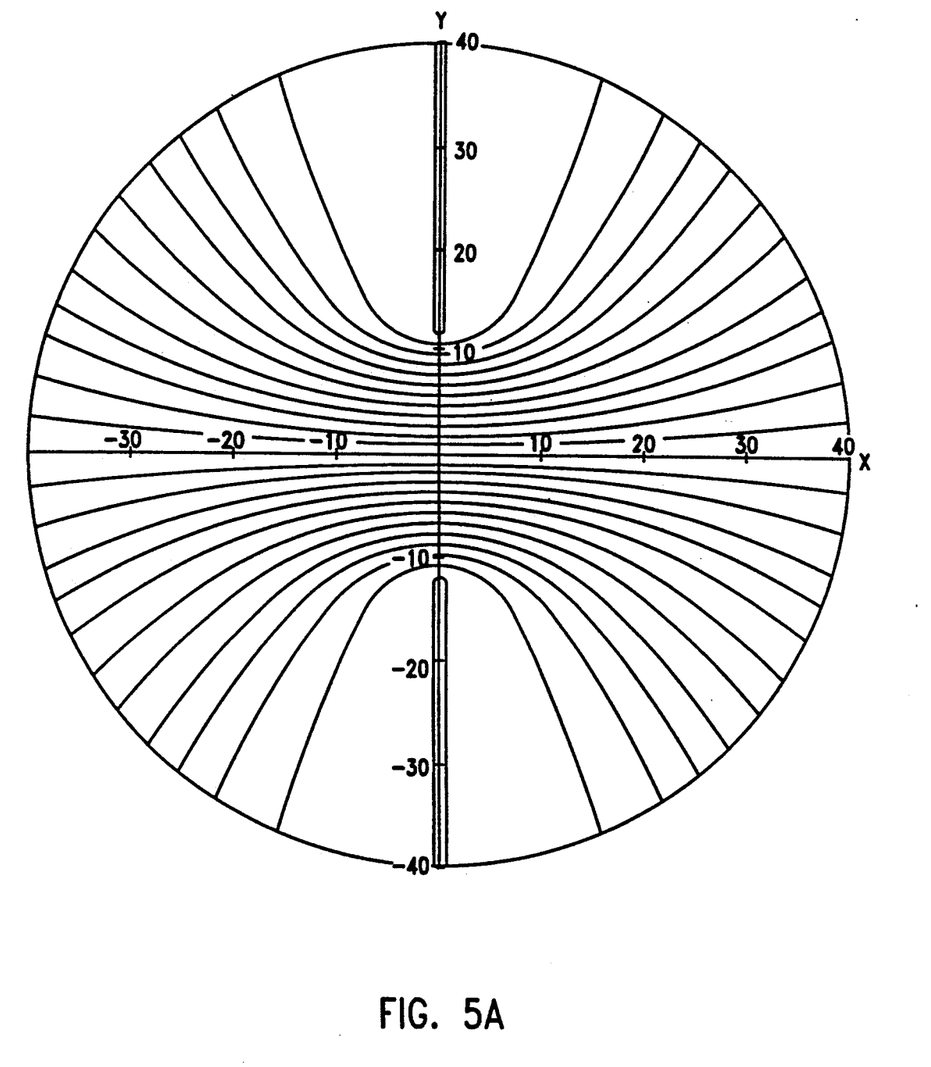
FIG. 5A is a plot of hyperbolic cosine spreading functions of a progressive lens in accordance with my invention.

Referring now to FIG. 5A, I have shown the hyperbolic cosine spreading functions defined by:

$0 = a = 1$
$c = 12$ mm
$b = ac$
$r = 3c(1-a^2)/a$

As before, in plotting any one of the curves of FIG. 5A, one first selects a value of "a" between zero and 1 and substitutes the corresponding values of c, b and r in equation (4). Values of the magnitude of y for various values of x are calculated and the resultant curve is plotted.

Figure 5B:
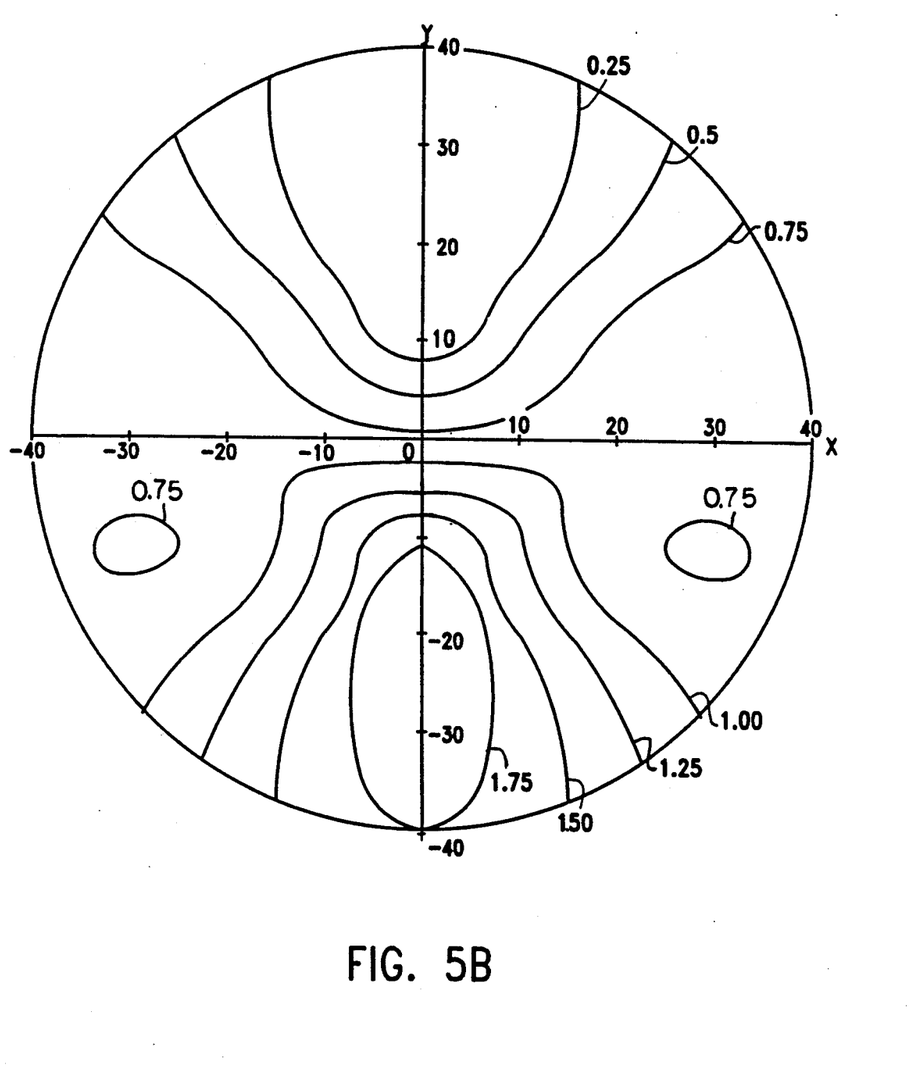
FIG. 5B is a plot of the "mean add" or amount by which the spherical-equivalent optical power exceeds the distance optical power for a lens having the spreading functions of FIG. 5A.

FIG. 5B is a plot of the mean add of the surface resulting from the spreading functions of FIG. 5A when the power curve is the involute of a circle.

Figure 5C:
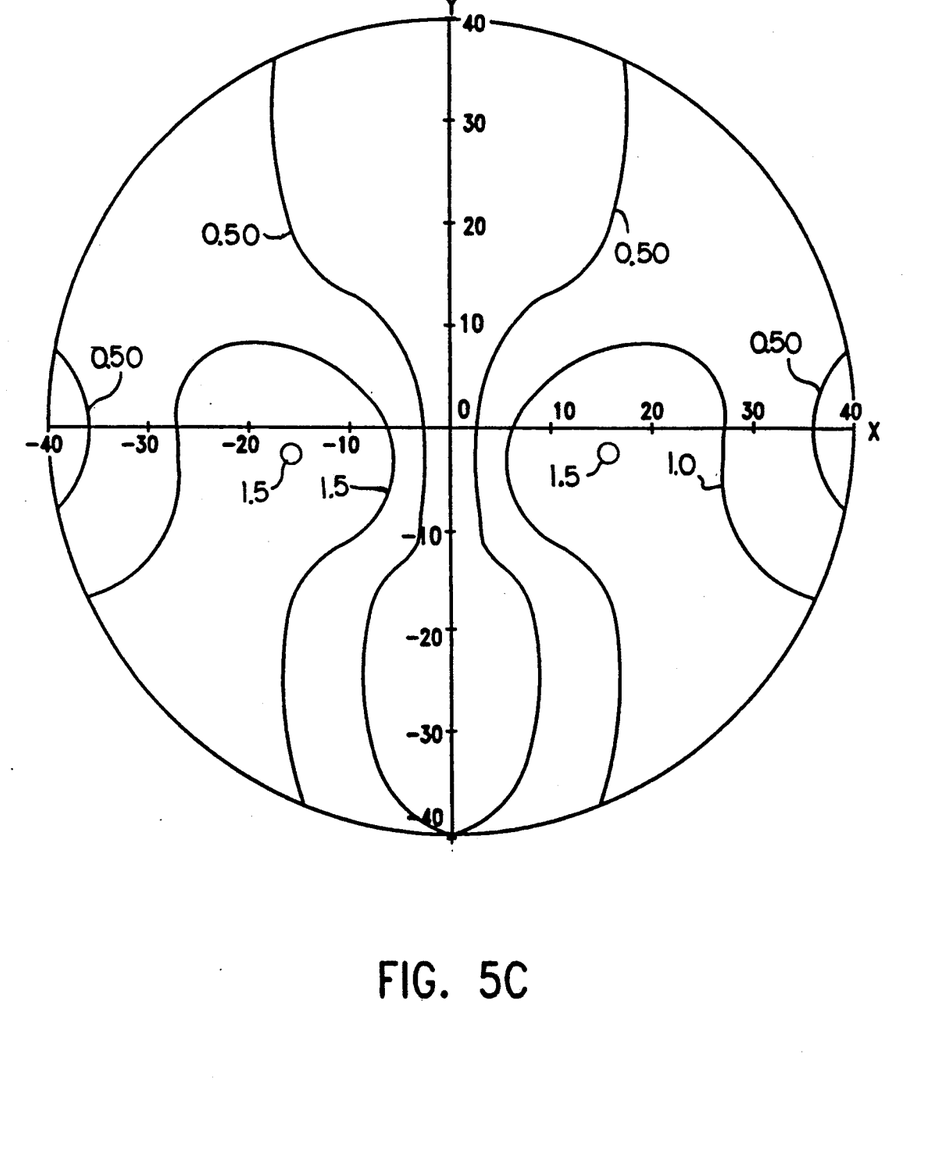
FIG. 5C is a plot of the surface astigmatism of a lens having the spreading functions of FIG. 5A.

FIG. 5C shows surface astigmatism. It will be seen that the maximum astigmatism for a surface formed in accordance with FIGS. 5A and 5B is 1.51 diopters while the average is 0.74 diopter.

As has been pointed out hereinabove in generating a progressive lens surface for the examples given above, for any point x,y on the A plot one merely goes to the y-intercept of the curve on which the point lies to determine the proper sagitta z from the power curve. In this way all points on the progressive surface are determined.

It will readily be appreciated that the spreading functions developed in accordance with my invention can be used with a wide range of power curves and power laws including those which give rise to harder designs. By harder designs are meant those in which surface astigmatism is concentrated in smaller areas down and to each side of the lens as a rule.

It will be seen that I have accomplished the objects of my invention. I have provided novel series of progressive lenses which overcome the defects of progressive lenses of the prior art. My progressive lenses have low minimum values of astigmatism. They have low average astigmatism. The spreading functions of my lenses may be non-bipolar conic sections such as hyperbolas, parabolas, circles and ellipses. They may be hyperbolic cosines.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A progressive power ophthalmic lens comprising a lens body with a progressive power surface having a first vision portion and a second vision portion, the power of one of said portions being different from the other in accordance with a power curve which lies entirely in the y-z plane of a Cartesian coordinate system and which is the umbilical portion of the principal meridian of said progressive surface, the curvature of said surface in at least one of said vision portions spreading away from said power curve in accordance with a spreading function defined by the intersection of nested non-bipolar conic sections with the x-y plane of said coordinate system.

2. A lens as in claim 1 in which said conic sections are hyperbolas.

3. A lens as in claim 1 in which said conic sections are parabolas.

4. A lens as in claim 1 in which said conic sections are circles.

5. A lens as in claim 1 in which said conic sections are ellipses.

6. A lens as in claim 1 in which said spreading functions are defined by the relationship $$x^2+(1+k)(|y|-b)^2-2r(|y|-b)=0$$

where the variable conic constant $k=k(a,c)$, the variable y-intercept $b=b(a,c)$, the variable radius of curvature $r=r(a,c)$, a is a running parameter and c is a which fixes the end points of the power curve.

7. A lens as in claim 6 in which said conic sections are hyperbolas.

8. A lens as in claim 7 in which $$0 \leq a \leq 1, c = 12 \text{ mm}, k = \frac{1 - .7225 - 1/a^2}{.7225},$$

$$b = ac \text{ and } r = \frac{c/.7225(1 - a^2)}{a}$$

9. A lens as in claim 8 in which the maximum astigmatism is about 1.34 diopters.

10. A lens as in claim 9 in which the average astigmatism is about 0.79 diopter.

11. A lens as in claim 6 in which said conic sections are parabolas.

12. A lens as in claim 11 in which $0 \leq a \leq 1$, $c=12$ mm, $k=-1$, $b=ac$ and $r=[c/2(0.50)^2](1-a^2)/a$.

13. A lens as in claim 12 in which the maximum astigmatism is about 1.30 diopters.

14. A lens as in claim 13 in which the average astigmatism is about 0.73 diopter.

15. A lens as in claim 6 in which said conic sections are circles.

16. A lens as in claim 15 in which $0 \leq a \leq 1$, $c=19$ mm, $k=0$, $b=ac$ and $r=0.373c(1-a^2)/a$.

17. A lens as in claim 16 in which the maximum value of surface astigmatism is about 0.56 diopter.

18. A lens as in claim 17 in which the average astigmatism is about 0.25 diopter.

19. A lens as in claim 7 in which c is arbitrary, $k=-1/a^2$, $b=ac$ and $r=c(1-a^2)/a$.

20. A progressive power ophthalmic lens comprising a lens body with a progressive power surface having a first vision portion and a second vision portion, the power of one of said portions being different from the other in accordance with a power curve which lies entirely in the y-z plane of a Cartesian coordinate system and which is the umbilical portion of the principal meridian of said progressive surface, the curvature of said surface in at least one of said vision portions spreading away from said power curve in accordance with a spreading function defined by the intersection of nested hyperbolic cosines with the x-y plane of said coordinate system.

21. A lens as in claim 20 in which said spreading function is defined by the relationship $$|y| = \frac{b[e^{(x/\sqrt{br})} + e^{-(x\sqrt{br})}]}{2}$$

where the variable y-intercept $b=b(a,c)$, the variable radius of curvature $r=r(a,c)$, a is a running parameter and c is a number which fixes the end points of the power curve.

22. A lens as in claim 21 in which $0 \leq a \leq 1$ where $c=12$ mm, $b=ac$ and $r=3c(1-a^2)/a$.

23. A lens as in claim 22 in which the maximum surface astigmatism is about 1.51 diopters.

24. A lens as in claim 23 in which the average astigmatism is about 0.74 diopter.

* * * * *

UNITED STATES PATENT AND TRADEMARK OFFICE
CERTIFICATE OF CORRECTION

PATENT NO. : 5,285,222
DATED : February 8, 1994
INVENTOR(S) : Richard P. Waido It is certified that error appears in the above-identified patent and that said Letters Patent is hereby corrected as shown below:

Column 7:
Claim 6, line 17, change "c is a which"
    to --c is a number which--.

Claim 12, line 37, change "$(1-a^2/a$"
    to --$(1-a^2)/a$.--

Signed and Sealed this

Twenty-first Day of June, 1994

Attest:

BRUCE LEHMAN

*Attesting Officer*     *Commissioner of Patents and Trademarks*